June 30, 1925.

G. WISE 1,543,896

TIRE BUILDING APPARATUS

Filed June 22, 1921

Inventor
Geo. Wise.
By Robert M Pierson
Atty.

June 30, 1925.

G. WISE

TIRE BUILDING APPARATUS

Filed June 22, 1921   2 Sheets-Sheet 2

1,543,896

Inventor
Geo. Wise.
By Robert M. Pierson
Atty.

Patented June 30, 1925.

1,543,896

UNITED STATES PATENT OFFICE.

GEORGE WISE, OF AKRON, OHIO, ASSIGNOR TO THE B. F. GOODRICH COMPANY, OF NEW YORK, N. Y., A CORPORATION OF NEW YORK.

TIRE-BUILDING APPARATUS.

Application filed June 22, 1921. Serial No. 479,540.

*To all whom it may concern:*

Be it known that I, GEORGE WISE, a citizen of the United States, residing at Akron, in the county of Summit and State of Ohio, have invented a certain new and useful Tire-Building Apparatus, of which the following is a specification.

This invention relates to apparatus for progressively pressing strips of tire-building material such as unvulcanized rubber onto a tire-support as in the manufacture of solid vehicle tires, which are usually built up in laminated form upon a metallic tire-support or base member. The base member is commonly formed with circumferential grooves in its outer periphery as a means of securing effective adhesion of the rubber thereto, and the first layer of plastic material, commonly a hard-rubber compound, requires to be pressed intimately into said grooves as well as against the intervening lands.

The chief objects of my invention are to provide means readily adaptable to work upon bases of different sizes and contours, and to provide improved means for pressing the material whereby several units may be closely assembled in combination with a calendar and operated with such brief stops to change the work as to utilize a substantial part of the output of the calender. Further objects and advantages will appear hereinafter.

Figure 1:
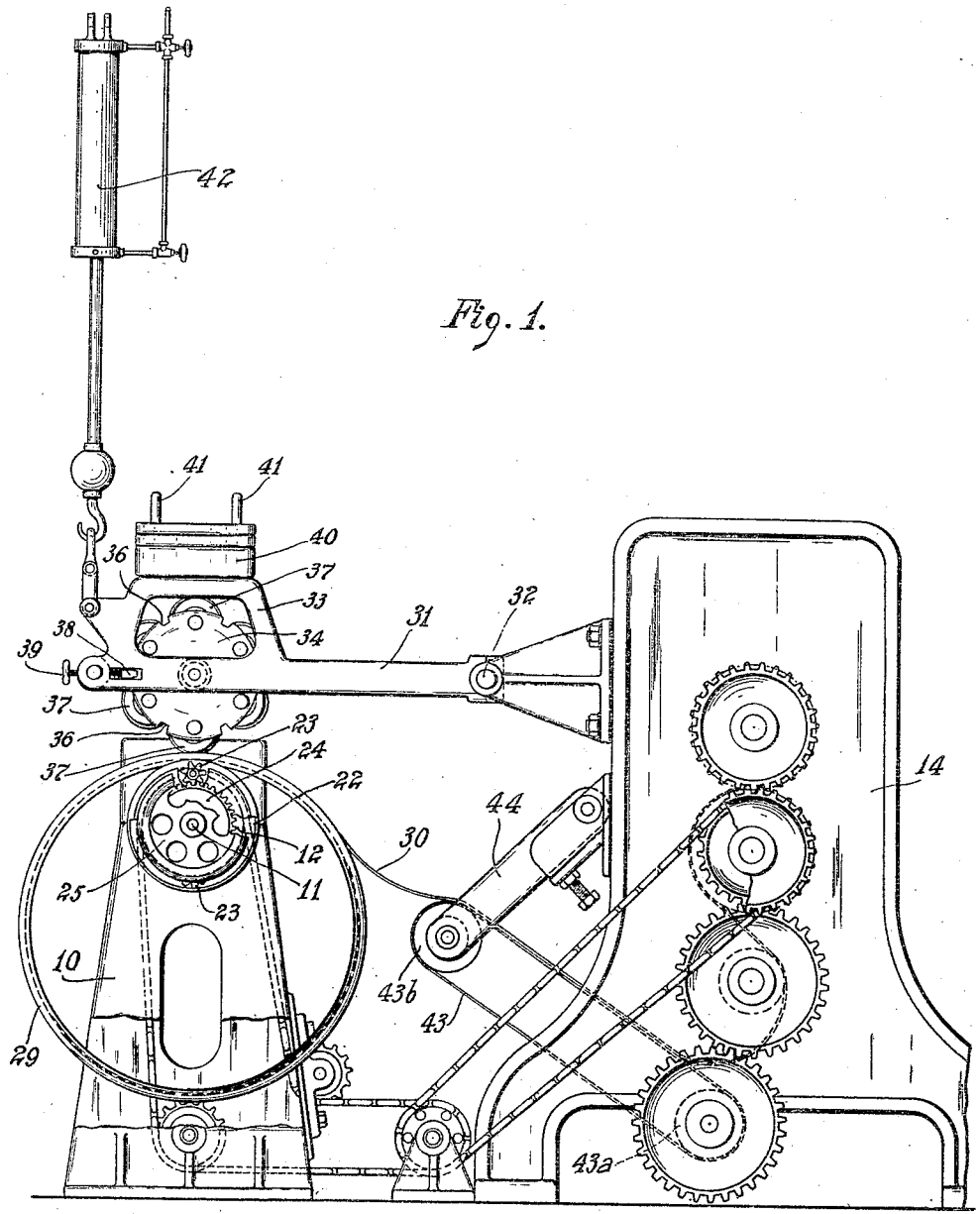
Fig. 1 is a side elevation of a preferred embodiment of my invention.

Referring to the drawings 10, is a hollow journal standard, through the top of which is journaled a horizontal, work-supporting shaft 11, extending an equal distance on each side of said standard, provided with a sprocket 12 within said hollow standard, and adapted to be driven by intermediate means clearly shown in Fig. 1 from a calendar 14, which latter may be equipped with the usual slitting knives (not shown) and thus adapted to supply strips of unvulcanized sheet rubber.

The standard 10 is provided with extended bearings, one of which is shown at 16 (Fig. 2), adapted to brace and preserve the alignment of said shaft. 17 is a large roller keyed upon said shaft adjacent said bearing, one end of said roller being hollow, as indicated by the numeral 19 (Fig. 2) to accommodate said bearing. Diametrically opposite sides of said roller are each formed with a pair of recesses 20, 20, extending inward from the ends of the roller, and each pair of said recesses is connected by a bearing aperture, parallel with the roller's axis, for a right-and-left-threaded screw 21, 21. 22, 22 are end-plates for said roller, the inner one being cut away around the bearing 16 and both of them being formed with bearings for the right-and-left-threaded screws 21, which screws extend beyond the outer plate 22, each screw being provided at its outer end with a small spur gear 23. 24 is a large spur gear loosely journaled upon the end of shaft 11, in mesh with gears 23, and 25 is a hand-wheel secured to said gear 24, being thus adapted to turn the right-and-left-threaded screws 21 in the same direction.

A pair of rings 26, 26 for guiding the work slidably fit the exterior of the roller 17 and are formed with ears or collars 27, 27, extending integrally from their inner peripheries into the recesses 20, 20, said collars having secured therein threaded bushings 28, 28 meshed with the screws 21.

The grooved tire-bases 29, 29 are pendularly supported by the rollers 17, fitting between the adjustable guiding rings 26, the rollers 17 engaging the inner peripheries of said bases at the top of the latter. 30 is a strip of unvulcanized rubber drawn from the calender 14 in process of being pressed onto one of said bases.

A lever 31 has one end pivoted at 32 to the calender 14, and the other end is formed with a housing 33 overhanging the roller 17, in which housing is journaled on a transverse axis a turret 34 consisting of two sections $34^a$, $34^b$, divided on a radial plane. Said sections at their outer ends are formed with large, circular radial flanges, said flanges being formed at their outer peripheries with corresponding bearings 35, 35, in spaced positions, and with notches 36, 36, extending radially inward from their outer circumferences. 37, 37 is a series of presser rollers of various widths and contours, journaled in said bearings 35 of the turret 34, each presser roller being adapted to work upon a different size or type of tire-base. The turret 34 as described is adapted to be turned upon its axis to bring the several presser rollers selectively into working position. 38, 38 are spring catches slidably mounted in a part of the housing 33, provided with hand-knobs 39, 39, and adapted to engage the notches 36 of the turret 34 to hold the latter against rotation, with the desired presser roller in working position. 40 is a series of weights mounted upon stud-pins 41, 41 upon the housing 33 and adapted to press the selected roller of the series 37 against the work. 42 is an air hoist adapted to lift the lever 31 and turret 34 from the work to permit the insertion and removal of the latter. 43 is a belt carrier, mounted at one end upon a roller 43$^a$ journaled in the calender frame and adapted to be driven by the calender, and at the other end upon a roller 43$^b$ journaled upon an adjustable arm 44 extending from the calender frame, said belt carrier being adapted to convey strips of rubber stock from the calender 14 to a point sufficiently close to the tire-base that the intervening reach of stock will not break of its own weight.

Figure 2:
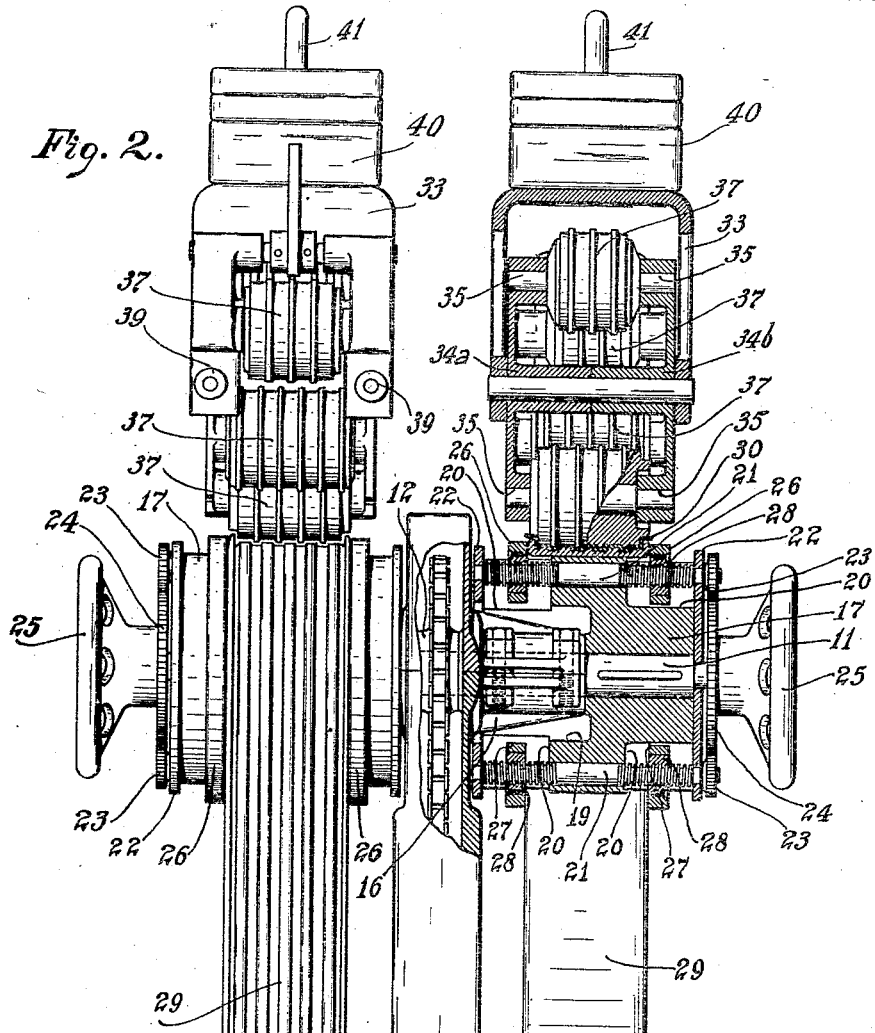
Fig. 2 is a front elevation of the same, partly in section.
Figure 3:
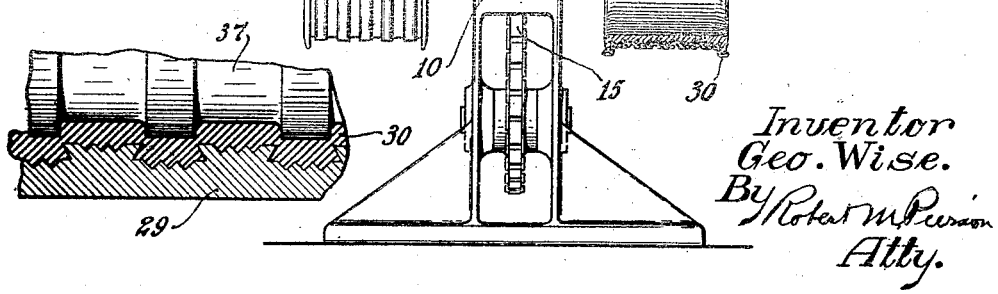
Fig. 3 is a fragmentary view of a presser roller in operative position upon the work, the latter being shown in section.

In the operation of the apparatus, in case a tire-base of a new size is to be covered, the rings 26 are spread apart by turning the hand wheel 25, a tire-base 29 is hung, as shown, upon the roller 17, and the rings 26 are brought toward each other by turning hand wheel 25 in the opposite direction until said rings approximately abut the sides of the tire-base, as shown in Fig. 2. The catches 38 are withdrawn from the notches 36 and the turret 34 is turned on its axis to bring into working position one of the presser rollers 37 corresponding to the particular type of tire-base, and the turret is there latched by the catches 38. Rotation of the roller 17 drives the tire-base 29. The strip of rubber stock 30 is brought up from the calender to the tire-base and its end started thereon, the revolving tire-base thereafter drawing the stock strip onto itself. The exhaust of the air hoist 42 is opened, permitting the turret 34 to descend and the selected presser roller 37 carried thereby to press the rubber stock onto the tire-base and into the grooves thereof. When the desired amount of rubber has thus been applied to the base the strip is severed and the turret 34 is lifted by means of the air hoist, permitting the removal of the work by lifting it from the roller 17, and the operation is repeated.

Several of the devices may be closely assembled adjacent the calender, so as to utilize a substantial part of the latter's output. Quick removal and insertion of the tire-bases is possible with this device, since the bases are simply hung upon the overhanging rollers 17. This, as well as the quick adjustment to different type of bases, results in economy in the time of the calender.

As the pressure is applied to the rubber on the outer periphery of the tire-base at a point adjacent the supporting roller 17, the pressure does not result in displacement or deformation of the tire-base.

Various modifications may be resorted to without departing from the scope of my invention, and I do not limit my claims wholly to the specific embodiment shown.

I claim:

1. Tire-building apparatus comprising a projecting roller adapted to support an annular tire-support hung thereon, a pair of guide rings encircling said roller and adapted to rotate therewith and to engage the opposite sides of said tire-support to position the same, and a right-and-left threaded member for adjusting said rings from and toward each other, said member lying within the circumference of said roller.

2. Tire-building apparatus comprising a projecting roller adapted to support an annular tire-support hung thereon, a pair of guide rings encircling said roller and adapted to rotate therewith and to engage the opposite sides of said tire-support to position the same, a plurality of right-and-left threaded members lying within the circumference of said roller for adjusting said rings from and toward each other, and means common to said members for rotating the same.

In witness whereof I have hereunto set my hand this 17 day of June 1921.

GEORGE WISE.